(12) United States Patent
Gaas et al.

(10) Patent No.: US 9,650,013 B2
(45) Date of Patent: May 16, 2017

(54) PEDESTRIAN PROTECTION SYSTEM FOR A VEHICLE

(71) Applicant: Volkswagen Aktiengesellschaft, Wolfsburg (DE)

(72) Inventors: Thorsten Gaas, Dedelstorf-Repke (DE); Andre Leschke, Wolfsburg (DE); Ulrich Hackenberg, Wettstetten (DE); Ricardo Ploeger, Wolfsburg (DE); Torsten Strutz, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/590,490

(22) Filed: Jan. 6, 2015

(65) Prior Publication Data

US 2015/0175120 A1    Jun. 25, 2015

Related U.S. Application Data

(63) Continuation of application No. PCT/EP2013/058004, filed on Apr. 17, 2013.

(30) Foreign Application Priority Data

Jul. 6, 2012    (DE) .................. 10 2012 013 327

(51) Int. Cl.
*B60R 22/00* (2006.01)
*B60R 21/34* (2011.01)
*B60R 21/0136* (2006.01)
*B60R 19/48* (2006.01)
*B60R 21/36* (2011.01)
(Continued)

(52) U.S. Cl.
CPC ............ *B60R 21/34* (2013.01); *B60R 19/483* (2013.01); *B60R 21/01* (2013.01); *B60R 21/0136* (2013.01); *B60R 21/36* (2013.01); *B60R 21/38* (2013.01); *B60R 2021/0004* (2013.01); *B60R 2021/01013* (2013.01); *B60R 2021/01252* (2013.01)

(58) Field of Classification Search
USPC ........................................................ 701/45
See application file for complete search history.

(56) References Cited

U.S. PATENT DOCUMENTS 6,415,883 B1    7/2002  Myrholt et al.
6,561,301 B1 *  5/2003  Hayashi ............ B60R 21/0136
                                                    180/274
(Continued)

FOREIGN PATENT DOCUMENTS

DE        103 21 160 A1    12/2004
DE    10 2004 052 880 A1     6/2005
(Continued)

*Primary Examiner* — Hussein A. Elchanti
(74) *Attorney, Agent, or Firm* — Muncy, Geissler, Olds & Lowe, P.C.

(57) ABSTRACT

A pedestrian protection system for a vehicle, having at least one impact-detecting sensor and a deformable element that are arranged between a cross-member and a bumper cover of the vehicle, and a control unit that analyzes the signals of the at least one sensor. In order to reduce the amount of space required, the deformable element is designed as a deformable member that it has a cavity in which the at least one sensor is arranged and detects changes in an electromagnetic field in the cavity.

17 Claims, 2 Drawing Sheets

(51) Int. Cl.
  *B60R 21/38* (2011.01)
  *B60R 21/01* (2006.01)
  *B60R 21/00* (2006.01)

(56) References Cited

U.S. PATENT DOCUMENTS

| | | | |
|---|---|---|---|
| 7,164,349 | B2 | 1/2007 | Kawaura et al. |
| 7,207,410 | B2* | 4/2007 | Song ............... B60R 21/0132 180/274 |
| 7,603,950 | B2 | 10/2009 | Dukart |
| 7,863,891 | B2 | 1/2011 | Kawaura et al. |
| 2001/0028163 | A1 | 10/2001 | Breed |
| 2004/0129479 | A1* | 7/2004 | Ozaki ............... B60R 21/0136 180/274 |
| 2005/0021192 | A1* | 1/2005 | Takafuji ............ B60R 21/0136 701/1 |
| 2006/0087132 | A1 | 4/2006 | Tanabe |
| 2007/0102220 | A1 | 5/2007 | Kiribayashi |
| 2007/0164574 | A1 | 7/2007 | Tanabe |
| 2007/0179693 | A1 | 8/2007 | Dukart et al. |
| 2008/0180091 | A1* | 7/2008 | Kakuya ............ G01D 5/2006 324/207.16 |
| 2009/0001976 | A1 | 1/2009 | Cech et al. |
| 2009/0319212 | A1* | 12/2009 | Cech ............... B60R 21/0136 702/65 |
| 2011/0232396 | A1 | 9/2011 | Takahashi et al. |

FOREIGN PATENT DOCUMENTS

| | | |
|---|---|---|
| DE | 103 60 138 A1 | 7/2005 |
| DE | 10 2004 003 199 A1 | 8/2005 |
| DE | 10 2004 009 301 A1 | 9/2005 |
| DE | 10 2004 034 001 A1 | 2/2006 |
| DE | 10 2005 048 382 A1 | 4/2006 |
| DE | 10 2006 051 750 A1 | 5/2007 |
| DE | 10 2007 001 387 A1 | 7/2007 |
| DE | 10 2007 017 496 A1 | 11/2007 |
| JP | 2000-326808 A | 11/2000 |
| JP | 2009-519181 A | 5/2009 |
| JP | 2011-137743 A | 7/2011 |

* cited by examiner

PEDESTRIAN PROTECTION SYSTEM FOR A VEHICLE

This nonprovisional application is a continuation of International Application No. PCT/EP2013/058004, which was filed on Apr. 17, 2013, and which claims priority to German Patent Application No. DE 10 2012 013 327.8, which was filed in Germany on Jul. 6, 2012, and which are both herein incorporated by reference.

BACKGROUND OF THE INVENTION

Field of the Invention

The present invention relates to a pedestrian protection system for a vehicle having at least one impact-detecting sensor and a deformation element, which are arranged between a crossmember and a bumper cover of the vehicle, and having a control unit which analyzes the signals of the at least one sensor.

Description of the Background Art

A pedestrian protection system is disclosed in DE 10 2004 009 301 A1, which corresponds to US2007179693, and in DE 103 60 138 A1.

In the embodiment disclosed in DE 10 2004 009 301 A1, a bumper cover is arranged in front of a foam and a crossmember of the vehicle. Acceleration sensors are attached to the bumper cover between the bumper cover and foam and/or the crossmember. The signals from the acceleration sensors are evaluated in a control unit. In the case of an impact between a pedestrian and the vehicle, pedestrian protection functions such as an external airbag, for example, are triggered to lessen the consequences of the accident for the pedestrian.

The installation location for the acceleration sensors behind the bumper cover is to be regarded as an essential feature of said prior-art pedestrian protection system. Because of this location, the acceleration sensors are mounted close to a possible point of impact by the pedestrian, so that their signal strengths increase considerably in the case of a pedestrian accident and reliable detection of the acceleration signals is possible.

In the embodiment disclosed in DE 103 60 138 A1, a bumper cover is arranged in front of a foam and a crossmember of the vehicle. Piezoelectric collision-detecting sensors are arranged between the crossmember and the foam. In the case of an impact of a pedestrian with the bumper cover, the pressure is transmitted via the foam to the piezoelectric collision detection sensors and generates an electrical voltage, which can be evaluated as a signal. A control unit controls pedestrian protection functions depending on said signal.

The use of piezoelectric collision-detecting sensors are to be regarded as an essential feature of this prior-art pedestrian protection system. Voltages, which arise, for example, due to prior damage to the sensor pickup surfaces and could negatively impact the collision detection, can be reduced in these sensors.

The aforementioned embodiments require foam behind the bumper cover as a deformation element, in order to lessen the impact of the pedestrian, or as a force-transmitting element to transmit the force of the impact to the sensors. A sufficiently large foam volume is needed to achieve these actions.

SUMMARY OF THE INVENTION

It is therefore an object of the present invention to provide a reduction of the space requirement of the above-described pedestrian protection system.

In an embodiment of the invention, a deformation element is configured as a deformable body with a cavity, in which the at least one sensor is arranged and detects changes in an electromagnetic field in the cavity.

According to an embodiment of the invention, the deformation element is thus deformed upon collision with a collision object, for example, a pedestrian. By the deformation of the deformation element the kinetic energy is converted to deformation energy in order to lessen the accident consequences for the pedestrian and the passengers. An effective lessening of the accident consequences is expediently achieved by a suitable selection of the material (material combinations may also be considered) and suitable dimensioning. The cavity is also changed in its spatial form (shape and/or volume) by the deformation of the deformation element. This leads to a change in the electromagnetic field in the cavity. An electromagnetic field is also understood to be an electric field or a magnetic field. Said change is detected by the at least one sensor and the resulting signals are analyzed by the control unit. A particular advantage of the pedestrian protection system of the invention is that the foam which takes up a great deal of space can be omitted without reducing the effectiveness of the pedestrian protection. This is useful especially in smaller vehicles in which sufficient space is otherwise not available to install an effective pedestrian protection system. In addition, a smaller space requirement also has advantages for design and costs. Thus, the overhang, for instance, can be shortened, which brings with it not only lower material costs but also more free space for the design.

A change in the electromagnetic field can be reliably detected, if the at least one sensor is formed as a capacitive or inductive sensor. An electric field component can be monitored with capacitive sensors and a magnetic field component with inductive sensors. Capacitive sensors moreover also operate reliably when an electrically nonconductive or only weakly conductive material, particularly a dielectric, enters the electromagnetic field. This is possible, for example, when the deformation element is made of a dielectric material.

In an embodiment, the deformation element can be made as a metallic cage. The use of metallic materials, for example, sheet metal, makes it possible, on the one hand, to use inductive sensors for detecting the change in the electromagnetic field alternatively or in addition to capacitive sensors. On the other hand, a metallic cage has a high energy absorbing capacity and flexibility in the case of an impact. It has proven especially advantageous to configure the metallic cage with slit-shaped openings.

An especially reliable installation of the deformation element is achieved with the deformation element attached to the crossmember. A large opening in the deformation element allows for the deformation element to be expediently attached to the crossmember so that the edge of the large opening lies against the crossmember.

The risk of injury and possible accident consequences for the pedestrian in an impact with the vehicle can be reduced, if the control unit is designed to trigger the pedestrian protection functions of the vehicle as a function of the signals of the at least one sensor. Advantageously a function of raising the hood of the vehicle, a so-called active hood or engine hood, is provided as the pedestrian protection function to be triggered. For example, a windshield airbag is also conceivable as a further pedestrian protection function to be triggered.

The change in the electromagnetic field can be detected especially reliably, particularly also resolved spatially and/or temporally, if a number of sensors which detect an electromagnetic field change and whose signals are analyzed by the control unit are arranged in the cavity. For example, these sensors can be arranged along the crossmember, particularly at the same intervals. It can be determined in this way whether a collision has occurred on the right side, in the middle, or on the left side of the vehicle. Pedestrian protection functions corresponding to the point of collision can be triggered selectively in this way.

The control unit is expediently designed to receive and analyze signals from additional sensors in order to verify signals from different sensors. Thus, faulty signals can be identified and filtered out. In addition, the possibility arises in this way for diagnosing and repairing damage to or malfunctions of sensors. An additional sensor could perhaps be configured as a camera, optionally with a suitable image processing unit. Advantageously, the control unit is designed to trigger pedestrian protection functions of the vehicle as a function of the signals of the at least one sensor and the signals of the additional sensors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
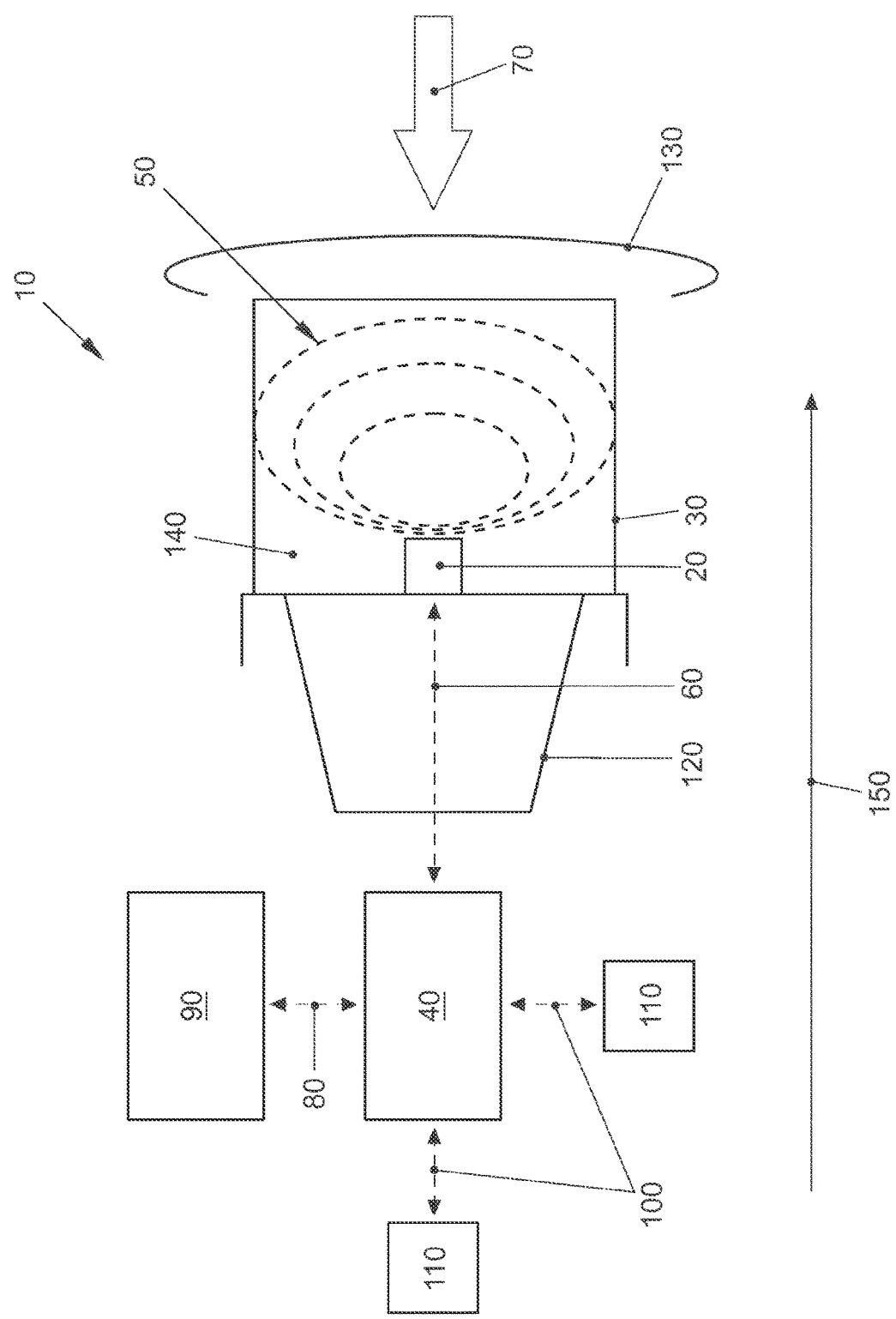
FIG. 1 shows in a side view a schematic diagram of the pedestrian protection system before a collision with a pedestrian and FIG. 2 shows in a side view a schematic diagram of the pedestrian protection system from FIG. 1 after the collision.

FIG. 1 shows a pedestrian protection system 10 of the invention. Pedestrian protection system 10 has a capacitive sensor 20, a deformation element 30, and a control unit 40.

Sensor 20 monitors an electric field 50 generated by sensor 20. Electric field 50 does not change during accident-free operation of the vehicle (not shown in greater detail) in which pedestrian protection system 10 is installed. Capacitive sensor 20 is connected to control unit 40 via a bidirectional data line 60, for example, a CAN bus (CAN: Controller Area Network). Capacitive sensor 20 transmits its signals via data line 60 to the capacitive sensor. Control unit 40 is capable of transmitting control signals to sensor 20 via data line 60. Such control signals can serve the following purposes: activating sensor 20; deactivating sensor 20; diagnosing sensor 20; and changing electrical field 50 in order to adjust the field strength to changed ambient conditions.

Control unit 40 analyzes the received signals from sensor 20 and decides whether a collision with a collision object 70, particularly a pedestrian, has occurred. In the present case, no collision has taken place yet.

Control unit 40 is connected via a bidirectional data line 80 to an active hood 90, which, for example, as a windshield airbag as well, represents a pedestrian protection function to be triggered. Active hood 90 is configured in such a way that it can be raised in the case of a control signal from control unit 40 in order to lessen the injury consequences for the pedestrian in an impact on the vehicle. Active hood 90 can also send signals to control unit 40 via data line 80. Such signals relate, for example, to information whether active hood 90 is ready for use or if there is a malfunction. In the case of a malfunction, the driver can be informed of said malfunction early and be enabled to have active hood 90 repaired. The notification of the driver occurs expediently via a display device in the vehicle, for example, on the display of an instrument cluster or infotainment system.

Control unit 40 is connected via bidirectional data lines 100 to additional sensors 110. Additional sensors 110, as sensor 20, serve to detect a collision with a collision object 70. Additional sensors 110 in particular may be: optical cameras, infrared sensors, near-field radar sensors, ultrasonic sensors, contact sensors, acceleration sensors, and pressure hose sensors. Control unit 40 is designed to combine and evaluate the signals from additional sensors 110 and sensor 20. The reliability of the detection of a collision can be increased by this so-called sensor data fusion in which redundant data are intentionally considered. It is thus possible, for example, to detect a collision reliably also when a sensor fails or sends a faulty signal.

Deformation element 30 is built as slit sheet metal cage and is arranged between a crossmember 120 and a bumper cover 130 of the vehicle. In this case, deformation element 30 is attached to crossmember 120. It can be seen that deformation element 30 has a cavity 140 in which sensor 20 is disposed, namely, in the back part of cavity 140, based on the direction of travel and the longitudinal axis of the vehicle, which is indicated by an arrow 150.

Figure 2:
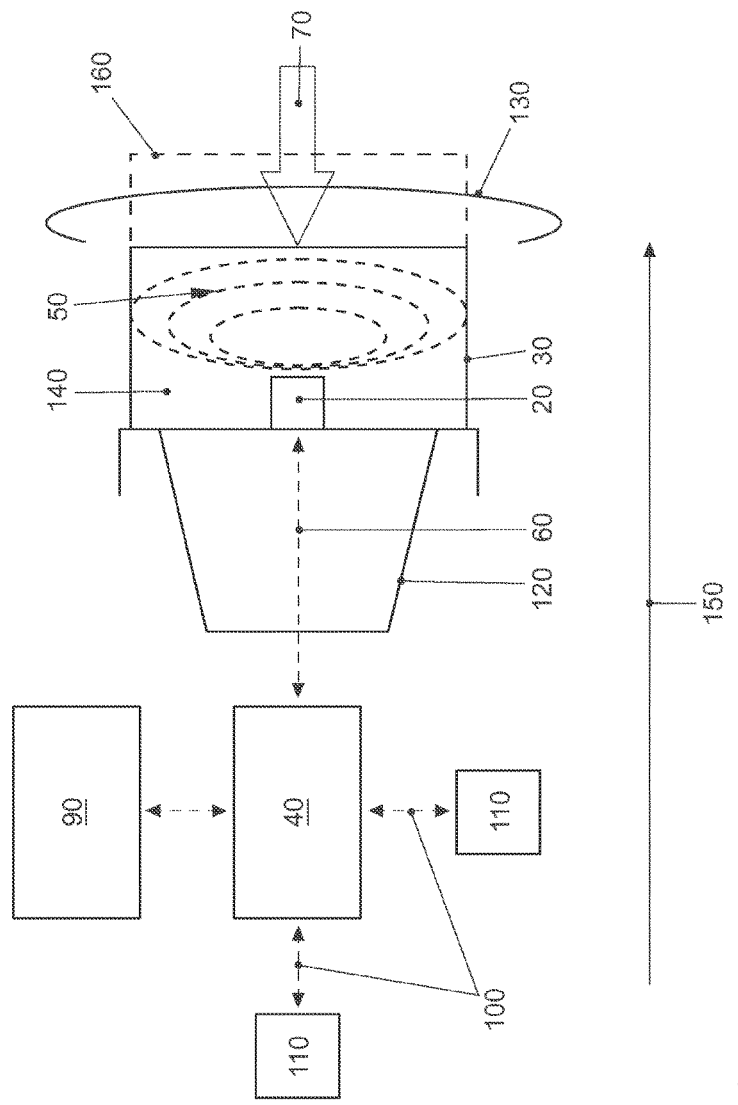

FIG. 2 shows pedestrian protection system 10 from FIG. 1 after a collision with collision object 70.

It can be seen that deformation element 30 has been compressed by the collision with collision object 70. A dashed line 150 indicates the front contour of deformation element 30 before the collision.

The compression of deformation element 30 led to a change in electric field 50. This change is detected by sensor 20, which thereupon sends corresponding signals via data line 60 to control unit 40. Control unit 40 thereupon matches these signals with the signals from additional sensors 110. In the present case, control unit 40 concludes that a collision with a pedestrian on the front section of the vehicle has occurred and sends a signal to raise active hood 90. Active hood 90 is thereupon raised in a predefined manner in order to intercept the pedestrian. For example, active hood 90 is raised by 10 to 20 centimeters. It is also possible to make the raising of active hood 90 dependent on the current speed of the vehicle and to raise active hood 90, for example, only at speeds between 20 km/h and 55 km/h.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pedestrian protection system for a vehicle, the system comprising:
   at least one impact-detecting sensor;
   a deformation element, the impact-detecting sensor and the deformation element are arranged between a crossmember and a bumper cover of the vehicle; and a control unit analyzing signals from the at least one sensor, wherein the deformation element is configured as a deformable body with a cavity in which the at least one sensor is arranged and wherein the control unit detects a deformation of a structural profile of the deformable body from changes in an electromagnetic field in the cavity, wherein the deformation element is configured as a metallic cage.

2. The pedestrian protection system according to claim 1, wherein the at least one sensor is configured as a capacitive or inductive sensor with which a change in an electromagnetic field is detectable.

3. The pedestrian protection system according to claim 1, wherein the deformation element is attached to the crossmember.

4. The pedestrian protection system according to claim 1, wherein the control unit triggers pedestrian protection functions of the vehicle as a function of the signals of the at least one sensor.

5. The pedestrian protection system according to claim 4, wherein a function of raising the hood of the vehicle and/or of triggering a windshield airbag is provided as the pedestrian protection function.

6. The pedestrian protection system according to claim 1, wherein a plurality of sensors that detect an electromagnetic field change and whose signals are analyzed by the control unit are arranged in the cavity.

7. The pedestrian protection system according to claim 1, wherein the control unit receives and analyzes signals from additional sensors.

8. The pedestrian protection system according to claim 7, wherein the control unit triggers pedestrian protection functions of the vehicle as a function of the signals of the at least one sensor and the signals of the additional sensors.

9. The pedestrian protection system according to claim 1, wherein the deformable body is a non-conductive dielectric.

10. The pedestrian protection system according to claim 1, wherein the deformable body absorbs an impact force of a collision.

11. The pedestrian protection system according to claim 1, wherein the deformable body substantially fills a space between the crossmember and the bumper cover of the vehicle.

12. A pedestrian protection system for a vehicle, the system comprising:
    at least one electromagnetic field sensor;
    a deformation element mounted on a crossmember of a vehicle frame and abutting a bumper cover of the vehicle, wherein the deformation element absorbs a force of an impact;
    a pedestrian protection device being activated upon impact with a pedestrian; and
    a control unit analyzing signals from the at least one electromagnetic field sensor,
    wherein the deformation element includes a cavity in which the at least one electromagnetic field sensor is arranged,
    wherein the control unit detects a deformation of a structural profile of the deformation element from changes in an electromagnetic field in the cavity, and
    wherein the deformation element is configured as a metallic cage.

13. The pedestrian protection system according to claim 12, wherein upon a deformation of the bumper cover, the bumper cover engages the deformation element first.

14. The pedestrian protection system according to claim 1, wherein the deformation element comprises an enclosed space surrounded by the metallic cage, and wherein the impact-detecting sensor is disposed inside the metallic cage.

15. The pedestrian protection system according to claim 1, wherein the control unit supplies current to the at least one impact-detecting sensor to generate an electromagnetic field, and wherein the control unit adjusts the current based on ambient conditions.

16. The pedestrian protection system according to claim 1, wherein the cavity of the deformation element is completely enclosed, and disposed entirely within the vehicle.

17. The pedestrian protection system according to claim 12, wherein the deformation element comprises an enclosed space surrounded by the metallic cage, and wherein the at least one electromagnetic field sensor is disposed inside the metallic cage.

\* \* \* \* \*